(12) United States Patent
LaPierre

(10) Patent No.: US 7,920,687 B2
(45) Date of Patent: Apr. 5, 2011

(54) COMMUNICATION NETWORKS INCLUDING FLASH HOOK DETECTORS AND METHODS OF OPERATING THE SAME

(75) Inventor: Stephen R. LaPierre, Union City, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1415 days.

(21) Appl. No.: 11/047,263

(22) Filed: Jan. 31, 2005

(65) Prior Publication Data

US 2006/0002537 A1 Jan. 5, 2006

Related U.S. Application Data

(60) Provisional application No. 60/584,391, filed on Jun. 30, 2004.

(51) Int. Cl.
*H04M 3/42* (2006.01)
(52) U.S. Cl. .................................................. 379/207.06
(58) Field of Classification Search .............. 379/207.06
See application file for complete search history.

(56) References Cited

U.S. PATENT DOCUMENTS 7,283,517 B2 * 10/2007 Yan et al. ..................... 370/352

* cited by examiner

*Primary Examiner* — Alexander Jamal
(74) *Attorney, Agent, or Firm* — Myers Bigel Sibley & Sajovec, P.A.

(57) ABSTRACT

A communication network that includes a flash hook detector and a communication device is operated by detecting a flash hook of the communication device at the flash hook detector. A signal is transmitted from the flash hook detector to the communication network responsive to detecting the flash hook. The flash hook is processed in the communication network.

19 Claims, 2 Drawing Sheets

COMMUNICATION NETWORKS INCLUDING FLASH HOOK DETECTORS AND METHODS OF OPERATING THE SAME

RELATED APPLICATION

This application claims the benefit of and priority to U.S. Provisional Patent Application No. 60/584,391, filed Jun. 30, 2004, the disclosure of which is hereby incorporated herein by reference as if set forth in its entirety.

FIELD OF THE INVENTION

The present invention relates to communication networks, and, more particularly, to Voice over Internet Protocol (VoIP) communication networks.

BACKGROUND OF THE INVENTION

A "flash hook" is a temporary disconnect of the local loop connection in a communication network. Telephones, for example, may include a button for generating a flash hook signal and/or a user may simply go on-hook for a short period of time. Unfortunately, in a Voice over Internet Protocol (VoIP) network where a trunk gateway is used, a user may need to use a keypad to signal a flash hook to the softswitch. Using the keypad to signal the flash hook may be awkward for a user and distracting to another party to the call.

SUMMARY OF THE INVENTION

According to some embodiments of the present invention, a communication network that includes a flash hook detector and a communication device connected via local loop is operated by detecting a flash hook of the communication device at the flash hook detector. A signal is transmitted from the flash hook detector to the communication network responsive to detecting the flash hook. The flash hook is processed in the communication network.

In other embodiments of the present invention, the signal is transmitted by transmitting a dual tone multi-frequency (DTMF) tone to the communication network responsive to detecting the flash hook.

In still other embodiments of the present invention, the DTMF tone comprises a 1633 Hz DTMF signal.

In still other embodiments of the present invention, the DTMF tone comprises a 941 Hz signal and a 1477 Hz signal.

In still other embodiments of the present invention, the communication network includes a trunk gateway that is coupled to a softswitch. The DTMF tone is transmitted from the flash hook detector to the trunk gateway.

In still other embodiments of the present invention, a session initiation protocol (SIP) message is transmitted to the softswitch responsive to receiving the DTMF tone at the trunk gateway.

In still other embodiments of the present invention, processing the flash hook includes processing the flash hook in the softswitch responsive to receiving the SIP message.

In further embodiments of the present invention, an electronic circuit comprises a flash hook detector that is configured to detect a flash hook of a communication device and to transmit a flash hook detection signal to a communication network via a local loop responsive to detecting the flash hook.

In still further embodiments of the present invention, the flash hook detector comprises a detection circuit that is configured to detect the on hook/off hook status of the communication device. A first timer circuit is configured to provide a first timing interval and a second timer circuit that is configured to provide a second timing interval. A third timer circuit is configured to generate an output signal responsive to an on hook condition lasting for at least a duration of the first timing interval and less than a duration of the second timing interval. A dual tone multi-frequency (DTMF) generator circuit is configured to generate the flash hook detection signal responsive to the output signal of the third timer circuit.

In still further embodiments of the present invention, the flash hook detector further comprises an oscillator circuit that is configured to generate a periodic output signal. The DTMF generator circuit is configured to generate the flash hook detection signal responsive to the output signal of the third timer circuit and the periodic output signal.

In still further embodiments of the present invention, the flash hook detector further comprises a hold circuit that is configured to generate an off hook state on the local loop for a duration corresponding to the second timing interval.

In still further embodiments of the present invention, the communication network comprises a trunk gateway and the flash hook detector is configured to transmit a dual tone multi-frequency (DTMF) tone to the trunk gateway responsive to detecting the flash hook.

In still further embodiments of the present invention, the DTMF tone comprises a 1633 Hz DTMF signal.

In still further embodiments of the present invention, the DTMF tone comprises a 941 Hz signal and a 1477 Hz signal.

In still further embodiments of the present invention, the flash hook detector is coupled to the local loop in parallel with the communication device.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
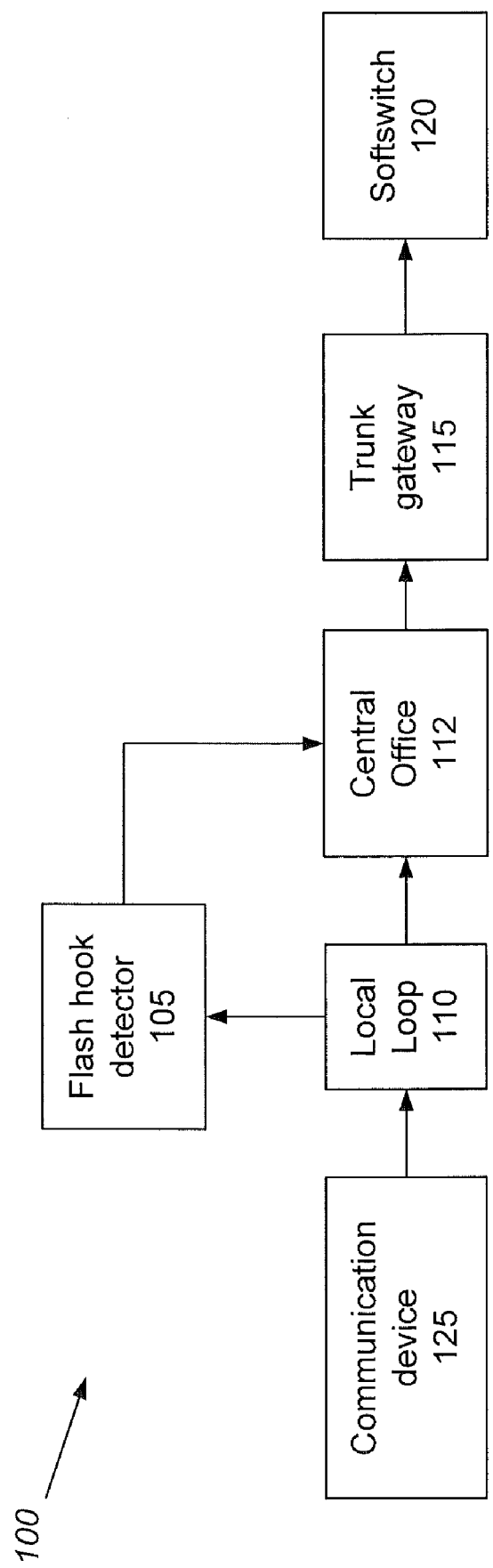
FIG. 1 is a block diagram that illustrates a communication network including a flash hook detector and methods of operating the same in accordance with some embodiments of the present invention.

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements. As used herein, the term "and/or" includes any and all combinations of one or more of the associated listed items. Like numbers refer to like elements throughout the description.

The terminology used herein is for the purpose of describing particular embodiments only and is not intended to be limiting of the invention. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to some embodiments of the invention shown in FIG. 1, a communication network 100 comprises a flash hook detector 105 that is configured to detect a flash hook from one or more communication devices 125 that are coupled to a local loop 110 and generate a signal in response thereto. In some embodiments, the signal may be a dual tone multi-frequency (DTMF) signal. When a local loop 110 or telephone line is communicatively coupled via a central office 112 to a trunk gateway 115 that is configured to recognize the DTMF signal generated by the flash hook detector, the trunk gateway 115 may generate a session initiation protocol (SIP) message, which is sent to an application server, such as a softswitch 120, to invoke flash hook call processing, In some embodiments of the present invention, the flash hook detector 105 may be connected to the local loop 110 in parallel with the one or more communication devices 125, such as telephone set(s). The flash hook detector 105 may detect off hooks, flash hooks, and on hooks by voltage monitoring. The flash hook detector 105 may be connected to an available telephone jack and may detect voltage changes that result from off hooks, flash hooks, and on hooks. In all embodiments, detection of a flash hook results in a flash detection signal, such as a DTMF tone, being transmitted back to the communication network. In some embodiments, the DTMF tone may comprise the 1633 Hz DTMF signal, which is not used in 12-button touchtone pads. Thus, the flash detection signal may comprise the 1633 Hz signal in combination with any one of the other DTMF signals associated with the rows of a keypad, which are the 697 Hz signal, the 770 Hz signal, the 852 Hz signal, and the 941 Hz signal.

Conventionally, the 1633 Hz DTMF signal is combined with the 697 Hz signal, the 770 Hz signal, the 852 Hz signal, and the 941 Hz signal to generate digits A, B, C, and D, respectively, according to the DTMF standard. Use of a non-standard DTMF tone may reduce the possibility of the flash detection signal adversely affecting interactive voice recognition (IVR) systems, for example.

In other embodiments, the flash detection signal may comprise the 941 Hz signal combined with a 1477 Hz signal, which corresponds to the third column on a conventional keypad. This tone is associated with the # key on a conventional keypad.

Figure 2:
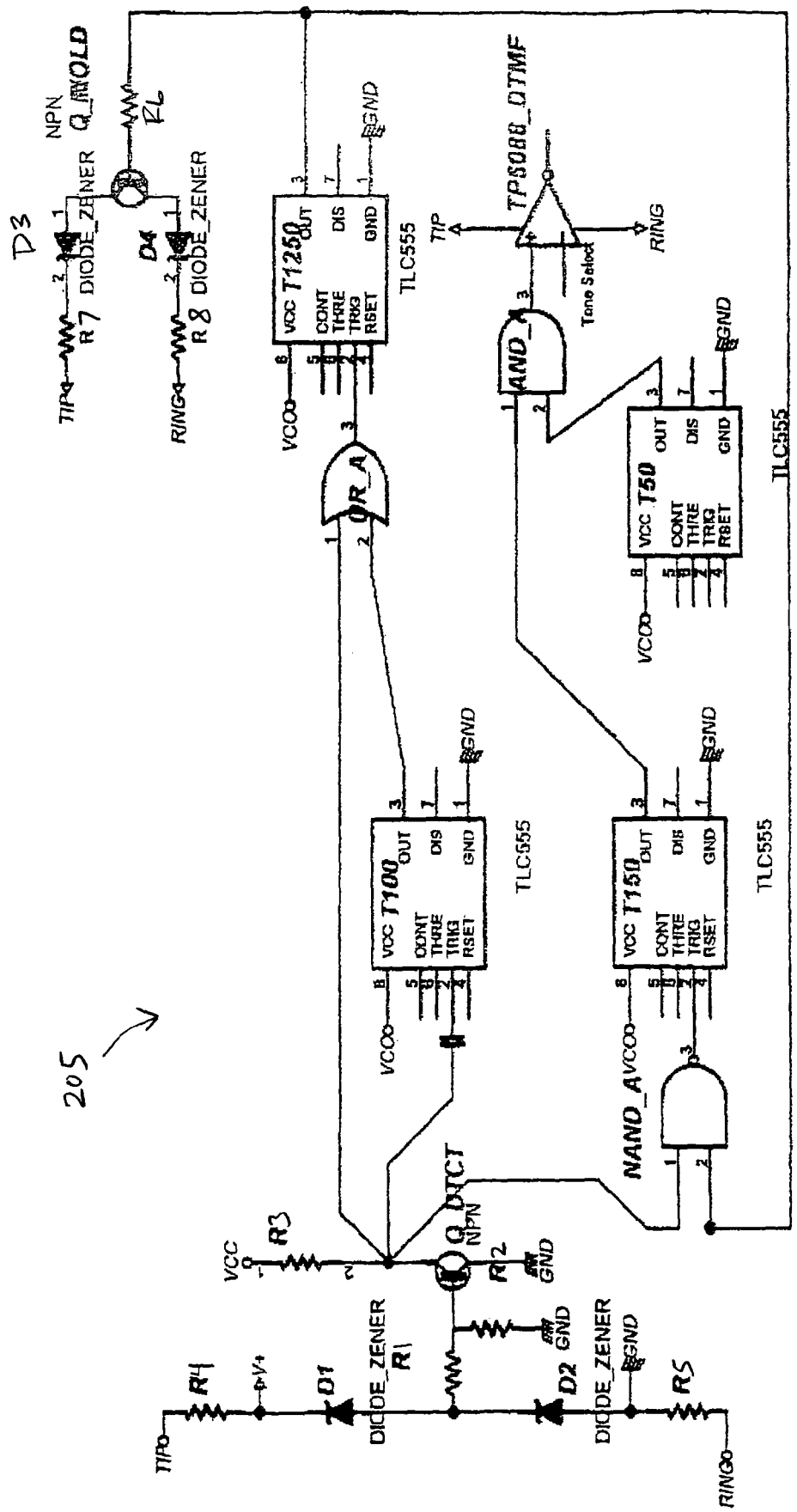
FIG. 2 is a schematic that illustrates the flash hook detector of FIG. 1 and methods of operating the same in accordance with some embodiments of the present invention.

Referring to FIG. 2, a flash hook detector 205 that may be used to implement the flash hook detector 105 of FIG. 1 according to some embodiments of the present invention, will now be described. The flash hook detector 205 comprises a detection transistor circuit that includes a detection transistor Q_DTCT along with biasing resistors R1, R2, and R3. An interface circuit that includes resistors R4 and R5 along with diodes D1 and D2 couple the detection transistor circuit to the tip and ring lines of a local loop. The collector terminal of the detection transistor Q_DTCT is coupled to three timer circuits: T100, T150, and T1250. These timer circuits may be 555 timers, in accordance with some embodiments of the present invention. These timer circuits are configured to generate a 100 ms pulse, a 150 ms pulse, and a 1250 ms pulse, respectively, in accordance with some embodiments of the present invention. The output of the T100 timer, along with the output from the Q_DTCT collector terminal, is coupled to the trigger terminal of the T1250 terminal via an OR gate OR_A. The output of the T1250 timer along with the output from the Q_DTCT collector terminal is coupled to the trigger terminal of the T150 timer via a NAND gate NAND_A.

The flash hook detector 205 further comprises an oscillator circuit T50, which may be a 555 timer in accordance with some embodiments of the present invention. The oscillator circuit T50 may be configured to generate 50 ms pulses periodically at an output terminal thereof. The output of the T50 oscillator circuit, along with the output of the T150 timer circuit, is coupled to a tone generator circuit TP5088_DTMF via an AND gate AND_A. The tone generator circuit TP5088_DTMF may be configured to generate a DTMF tone responsive to the output of the AND gate AND_A and a tone select signal.

The flash hook detector 205 further comprises a hold circuit that includes a hold transistor Q_HOLD, along with resistors R6, R7, and R8 and diodes D3 and D4. The hold circuit is coupled to the output of the T1250 timer as shown.

Exemplary operations of the flash hook detector 205, according to some embodiments of the present invention, will now be described with reference to FIG. 2. As a preliminary matter, the timer circuits T100, T150, and T1250 may be configured for activation, i.e., generation of a pulse on an output terminal, upon a high to low transition on the trigger terminal. When a communication device goes off hook, the voltage between the tip and ring terminals of the local loop drops such that there is little to no current flow through the diodes D1 and D2. As a result, the detection transistor Q_DTCT is turned off and the collector terminal of the detection transistor Q_DTCT is pulled high.

When the communication device goes on hook to initiate a flash hook, the voltage between the tip and ring terminals increases so as to turn the detection transistor Q_DTCT on and drive the collector terminal of the Q_DTCT transistor low. This results in a high to low transition on the trigger terminal of the T100 timer, which generates a 100 ms pulse at the output terminal of the T100 timer. The T100 timer may be used to ensure that the on hook operation is indeed a flash hook by ensuring that the on hook state is maintained for at least 100 ms. If the on hook state is not maintained for at least 100 ms, then a flash detection signal will not be generated as the on hook is presumed to be inadvertent.

Once the 100 ms pulse completes, the inputs to the OR_A logic gate are both low, which causes a high to low transition at the trigger terminal of the T1250 timer. The T1250 timer generates at high pulse at an output terminal thereof for 1250 ms to provide time for the communication terminal to go back off hook. That is, if the communication terminal goes off hook before the end of the 1250 ms pulse, then the on hook-off hook sequence is considered a flash hook. If, however, the communication terminal stays on hook through the duration of the 1250 ms pulse, then the on hook is considered a disconnect. To ensure that a flash hook is not falsely interpreted as a disconnect, the 1250 ms pulse output from the T1250 timer is used to turn on the Q_HOLD transistor which sends a "false" off hook signal back to the central office 112 through the tip and ring terminals.

The high output from the T1250 output terminal is provided to the NAND_A logic gate. The output of the NAND_A logic gate is still high, but when the communication device goes off hook during the 1250 ms pulse, the detection transistor Q_DTCT is turned off, which results in a second high value at the input of the NAND_A gate. This causes a high to low transition at the trigger terminal of the T150 timer resulting in a 150 ms pulse at the output terminal of the T150 timer. The 150 ms pulse output from the T150 timer allows the 50 ms pulses generated by the oscillator circuit T50 to be passed to the DTMF tone generator TP5088_DTMF. Thus, based on the particular DTMF tone selected, the DTMF tone generator TP5088_DTMF may generate at least two and possibly three bursts of DTMF tone, which may be provided to a trunk gateway as a flash detection signal. Moreover, the DTMF tone selected may comprise the 1633 Hz DTMF signal as discussed above.

The flash detection signal may be received and detected by a trunk gateway, which may transmit a SIP message to a softswitch where flash hook call processing is performed. Advantageously, the flash hook detector may be installed on a conventional telephone jack. Moreover, only one flash hook detector may be needed per telephone line.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

That which is claimed:

1. A method of operating a communication network that comprises a flash hook detector and a communication device that are connected to the communication network via a local loop that terminates at a central office, the method comprising:
    detecting a flash hook of the communication device on the local loop that terminates at the central office at the flash hook detector;
    transmitting a signal from the flash hook detector to the communication network via the local loop responsive to detecting the flash hook; and
    processing the flash hook in the communication network.

2. The method of claim 1, wherein transmitting the signal comprises:
    transmitting a dual tone multi-frequency (DTMF) tone to the communication network responsive to detecting the flash hook.

3. The method of claim 2, wherein the DTMF tone comprises a 1633 Hz DTMF signal.

4. The method of claim 2, wherein the DTMF tone comprises a 941 Hz signal and a 1477 Hz signal.

5. The method of claim 2, wherein the communication network comprises a trunk gateway that is coupled to a softswitch, and wherein transmitting the signal comprises:
    transmitting the DTMF tone from the flash hook detector to the trunk gateway.

6. The method of claim 5, further comprising:
    transmitting a session initiation protocol (SIP) message to the softswitch responsive to receiving the DTMF tone at the trunk gateway.

7. The method of claim 6, wherein processing the flash hook comprises:
    processing the flash hook in the softswitch responsive to receiving the SIP message.

8. A communication network, comprising:
    a switched network comprising a central office and a trunk gateway;
    a communication device communicatively coupled to the switched network via a local loop that terminates at the central office; and
    a flash hook detector communicatively coupled to the switched network via the local loop and is communicatively coupled to the communication device, the flash hook detector being configured to detect a flash hook of the communication device on the local loop and transmit a signal to the trunk gateway responsive to detecting the flash hook.

9. The communication network of claim 8, wherein the flash hook detector is configured to transmit a dual tone multi-frequency (DTMF) tone to the trunk gateway responsive to detecting the flash hook.

10. The communication network of claim 9, wherein the DTMF tone comprises a 1633 Hz DTMF signal.

11. The communication network of claim 9, further comprising a softswitch communicatively coupled to the trunk gateway; and
    wherein the trunk gateway is configured to transmit a session initiation protocol (SIP) message to the softswitch responsive to receiving the DTMF tone at the trunk gateway.

12. The communication network of claim 8, wherein the flash hook detector is coupled to the local loop in parallel with the communication device.

13. An electronic circuit, comprising:
    a flash hook detector that is configured to detect a flash hook of a communication device on a local loop that terminates at a central office and to transmit a flash hook detection signal to a communication network via the local loop responsive to detecting the flash hook;
    wherein the flash hook detector comprises:
    a detection circuit that is configured to detect the on hook/off hook status of the communication device;
    a first timer circuit that is configured to provide a first timing interval;
    a second timer circuit that is configured to provide a second timing interval;
    a third timer circuit that is configured to generate an output signal responsive to an on hook condition lasting for at least the first timing interval and less than the second timing interval; and
    a dual tone multi-frequency (DTMF) generator circuit that is configured to generate the flash hook detection signal responsive to the output signal of the third timer circuit.

14. The electronic circuit of claim 13, wherein the flash hook detector further comprises:
    an oscillator circuit that is configured to generate a periodic output signal; and
    wherein the DTMF generator circuit is configured to generate the flash hook detection signal responsive to the output signal of the third timer circuit and the periodic output signal.

15. The electronic circuit of claim 13, wherein the flash hook detector further comprises:
   a hold circuit that is configured to generate an off hook state on the local loop for a duration corresponding to the second timing interval.

16. The electronic circuit of claim 13, wherein the communication network comprises a trunk gateway and wherein the flash hook detector is configured to transmit a dual tone multi-frequency (DTMF) tone to the trunk gateway responsive to detecting the flash hook.

17. The electronic circuit of claim 16, wherein the DTMF tone comprises a 1633 Hz DTMF signal.

18. The electronic circuit of claim 16, wherein the DTMF tone comprises a 941 Hz signal and a 1477 Hz signal.

19. The electronic circuit of claim 13, wherein the flash hook detector is coupled to the local loop in parallel with the communication device.

\* \* \* \* \*